United States Patent [19]
Truchsess et al.

[11] Patent Number: 4,929,826
[45] Date of Patent: May 29, 1990

[54] MOUTH-OPERATED CONTROL DEVICE

[76] Inventors: Joseph Truchsess, 11 Windward La., City Island, N.Y. 10464; Michael Matthews, 245 E. 63rd St., New York, N.Y. 10021

[21] Appl. No.: 249,709

[22] Filed: Sep. 26, 1988

[51] Int. Cl.[5] .................... G01V 9/04
[52] U.S. Cl. .................... 250/221; 250/215
[58] Field of Search .................... 250/221, 222.1, 215; 434/116

[56] References Cited

U.S. PATENT DOCUMENTS

| | | | |
|---|---|---|---|
| 2,437,916 | 3/1948 | Greenwald | 250/221 |
| 3,192,321 | 6/1965 | Nassimbene | 250/221 |
| 4,373,471 | 2/1983 | Coulbourn | 250/221 |

*Primary Examiner*—David C. Nelms

[57] ABSTRACT

A light-sensitive device is placed so as to receive a portion of the ambient light energy present within the mouth of the operator. The amount of ambient light impinging upon the sensing device is then modulated by movement of the lips and teeth of the operator, controlling some external process.

13 Claims, 1 Drawing Sheet

FIG. 1
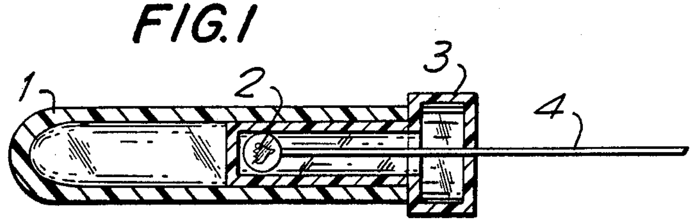
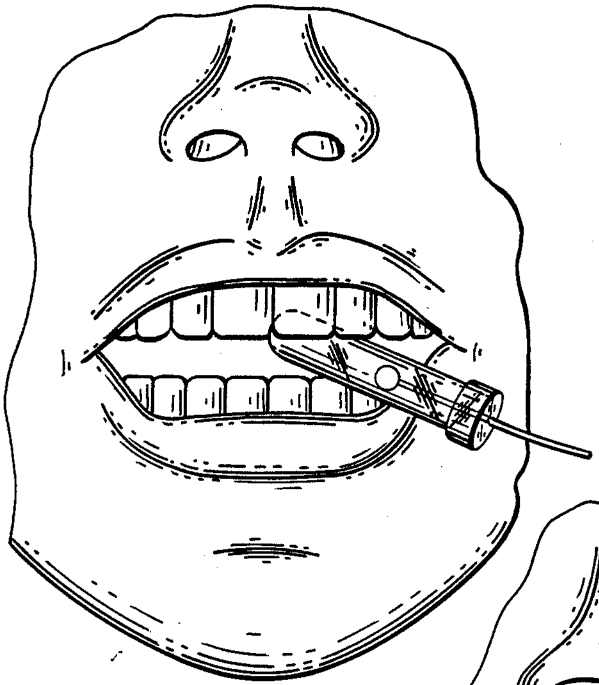
FIG. 2
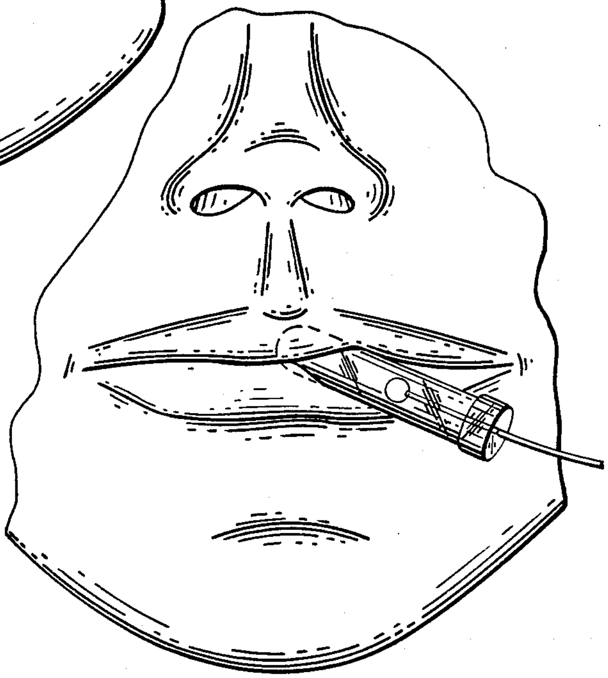
FIG. 3

MOUTH-OPERATED CONTROL DEVICE

FIELD OF THE INVENTION

The present invention relates to general-purpose control devices which translate some type of bodily motion into corresponding variations in electrical signals or parameters, specifically motions of the mouth.

BACKGROUND OF THE INVENTION

A variety of devices are known for translating bodily movements of one kind or another into variations in electrical signals or parameters. The most common of these are manually-operated rotary and linear potentiometers, manipulated by the hand(s) of the operator. While this is in many cases satisfactory, in some instances the hands of the operator are unavailable for these tasks, as in the case of a musician, both of whose hands may be occupied in the manipulation of an instrument. To circumvent this problem, control devices have been mounted in pedals for manipulation by the feet. This often proves clumsy in practice, as foot dexterity in most persons is less developed than manual dexterity. There are also instances where both the hands and the feet of the operator are unavailable, as in the case of musicians playing instruments which require both hand and foot operation, the case of disabled persons who have lost the use of hands and feet, and the case of persons operating complex machinery requiring the use of hands and feet.

There exist in the art several devices which sense eye movements and/or blinking. U.S. Pat. No. 3,379,885 by C. L. Nork and U.S. Pat. No. 4,081,623 by A. W. Vogeley illustrate two such devices. These are generally awkward and obtrusive in use, requiring a head-mounted apparatus aimed at the eye(s). They are often binary in nature, generating only pulse-type signals indicating only that an eye movement has or has not occurred. Furthermore, they are relatively costly, precluding their use in general, consumer-oriented products.

Several types of mouth-operated devices are also in common use, particularly in the field of electronic musical instrument control. One type requires the operator to blow or suck on a hollow tube, causing a flow of air or a pressure variation which is sensed electronically. Another type requires the operator to "bite", with varying intensity, on a pressure-sensitive device. These mouth-operated devices overcome the limitations of the manual, pedal, and ocular devices previously mentioned, but all involve relatively expensive and/or "exotic" technology. In certain cases, particularly the control of resonant filters in spectral shaping of electronic musical instruments, their particular mode of operation may lack "naturalness", due to a lack of correspondence between the mouth movements of the operator and the resultant "vocal" qualities of the filtered instrument.

Control by spoken sounds is also well-known, however, simple, inexpensive sound-operated devices are generally limited to binary, on-off type operation. More elaborate speech-operated devices are available in the form of computerized speech-recognition systems which can distinguish between various spoken words, but these are costly, problematic in high-noise environments, and provide discontinuous control functions, i.e. separate on-off outputs for each recognized utterance. Another type of voice-activated controller is the vocoder, which can superimpose the spectral weighting of spoken utterances onto an instrument's sound. Vocoders are well-suited to tonal modification of electronc musical instruments, but are complex and costly, and are not general-purpose control devices.

SUMMARY OF THE INVENTION

It is the object of the invention to provide a means of control by movement of the mouth.

It is a further object of the invention to provide such a means of control whereby continuously variable control may be achieved, rather than discrete, on-off control, if so desired.

It is a further object of the invention to provide such a means of control which, when used to control frequency-selective filters acting upon the output of electronic musical instruments, can afford a degree of correspondence between the operator's mouth movements and the resultant "vocal" quality of the filtered sound, i.e. the operator's facial expression will appear to be producing a vocalization similar to the sound being produced by the instrument.

It is another object of the invention to provide such a means of control that may be fabricated from commonly available parts, is manufacturable at low cost, and which is highly commercial.

These and many other objects and advantages of the present invention will be readily apparent to one skilled in the art to which the invention pertains from the claims and from the perusal of the following detailed description in connection with the appended drawings.

In accordance with the aforementioned objects the present invention comprises a light-sensitive device whose electrical characteristics are dependent upon the amount of light impinging upon its surface, which is placed within or coupled optically to the interior of the mouth of the operator, who may then vary the amount of ambient light impinging on the sensor by opening and closing his or her mouth in varying degrees.

BRIEF DESCRIPTION OF THE DRAWINGS

FIG. 1 is a cross-sectional view of an embodiment of the invention.

FIG. 2 is a pictorial view of an embodiment of the invention in use, operator's mouth open.

FIG. 3 is a pictorial view of an embodiment of the invention in use, operator's mouth closed.

DRAWING REFERENCE NUMERALS

1 Replaceable Mouthpiece
2 Light-Sensitive Device
3 Sensor Housing
4 Wiring

DETAILED DESCRIPTION OF THE INVENTION

With reference to the cross-sectional view shown in FIG. 1, the preferred embodiment of the invention comprises a light-sensitive device 2 encapsulated within a translucent housing 3, which protects it from moisture. The light-sensitive device may be any one of a number of such well-known and commonly available devices, including photo-conductive cells, silicon or other photovoltaic cells, and phototransistors. Wiring 4 connects the sensor to whatever circuitry is to be controlled. In applications where wires are unacceptable, they may be replaced by suitable wireless transmission means, e.g. a radio control system. Replaceable mouthpiece 1, composed of translucent material, preferably soft, slips over the housing and is held by friction or other means. While the mouthpiece could be made integral with the housing, replaceability provides a measure of protection from disease transmission by allowing mouthpieces to be changed between operators. The shape of the embodiment as shown in cylindrical, but may be any shape, preferably one which is found to be comfortable and easily held in the mouth.

OPERATION

Referring to the pictorial views shown in FIGS. 2 and 3, the sensor or light transmissive means is positioned partly or entirely within the operator's mouth such that the amount of ambient light impinging upon the sensor may be varied by movements of the operator's lips and/or teeth. FIG. 2 shows the operator's mouth open, admitting ambient light, while FIG. 3 shows the operator's mouth closed, blocking ambient light. Coarse control of the sensor's response is achieved by varying the degree to which the device is inserted within the mouth of the operator. This adjustment can compensate to a large degree for variations in ambient light level, and in practice has been found to be made intuitively by the operator by manipulation of the teeth and lips to find the optimal operating point. While the simplest configuration as shown in the Figs. is one where the device is held by the teeth of the operator, the device may alternatively be held by any type of external stand or frame. With the device thus held, the operator need no longer hold his or her teeth clenched on the device, and the mouth may be opened to a greater degree for modulating the light falling on the sensor or for speaking or singing.

Thus the reader will see that the mouth-operated control device of the invention provides a simple, low-cost, means of obtaining continuous control of an electrical parameter which may be used to control any external system. Furthermore, it can be seen that unlike previous mouth-controlled devices, the operator's mouth may open and close freely in the manipulation of the device, so that when the invention is used to control frequency-selective filters acting upon the output of musical instruments, the operator's facial expression can appear to be producing a vocalization similar to the sound being produced by the instrument.

While the above description contains many specificities, these should not be construed as limitations on the scope of the invention, but rather as an exemplification of one preferred embodiment thereof. Many other variations are possible. For example, the housing and mouthpiece could be combined and formed as one piece; a radio transmitter could replace the wiring; the light-sensitive device could be remotely located from the operator's mouth and ambient light from the mouth conducted to the sensing device by light-transmissive means, e.g. fiber optic material; the invention could be combined with any of the prior art types of mouth sensors; the device could be made with an integral holder which would support it around the operator's head or neck, and so forth. Accordingly, the scope of the invention should be determined not by the embodiment illustrated, but by the appended claims and their legal equivalents.

We claim:

1. An apparatus for performing machine control functions by use of the machine operator's mouth movements comprising an electronic light-sensitive element; and a light-transmissive mouthpiece fitted thereover so that the apparatus may be placed to receive a portion of the ambient light energy present within the mouth of the operator.

2. The apparatus of claim 1 wherein said light-sensitive element is placed partially or entirely within the mouth of the operator.

3. The apparatus of claim 1 wherein ambient light from the interior of the operator's mouth is coupled to said light-sensitive element by light-transmissive means.

4. The apparatus of claim 1 wherein said light-sensitive element is a cadmium sulfide photocell.

5. The apparatus of claim 1 wherein said light-sensitive element is a cadmium selenide photocell.

6. The apparatus of claim 1 wherein said light-sensitive element is a photovoltaic cell.

7. The apparatus of claim 1 wherein said light-sensitive element is a phototransistor.

8. The apparatus of claim 1 further comprising means for transmitting the output of said electronic light-sensitive element to the controlled machine.

9. The apparatus of claim 1 wherein said mouthpiece is removable from said element.

10. A method for performing machine control function by use of the machine operator's mouth movements, comprising positioning an electronic light-sensitive element relative to the operator for receiving a portion of the ambient light energy present within the mouth of the operator, and using the output of said element to control said machine function.

11. The method of claim 10 wherein said positioning step comprises placing said light-sensitive element partially or entirely within the mouth of the operator.

12. The method of claim 10 further comprising placing a light-transmissive mouthpiece over said light-sensitive element.

13. The method of claim 12 wherein said placing step comprises placing a removable light-transmissive mouthpiece over said light-sensitive element.

* * * * *